United States Patent [19]
Boll et al.

[11] Patent Number: 5,788,597
[45] Date of Patent: Aug. 4, 1998

[54] PROCESS AND APPARATUS FOR BRAKING A HYBRID-DRIVE MOTOR VEHICLE

[75] Inventors: Wolf Boll, Weinsteige; Herbert Botzelmann, Rosenstrasse; Peter Antony, Katharinenstrasse, all of Germany

[73] Assignee: Mercedes-Benz AG, Germany

[21] Appl. No.: 575,950

[22] Filed: Dec. 22, 1995

[30] Foreign Application Priority Data

Dec. 23, 1994 [DE] Germany ............... 44 46 485.1

[51] Int. Cl.$^6$ ............... B60L 7/10; B60L 7/20; B60L 7/26; B60K 41/20
[52] U.S. Cl. ............... 477/4; 477/185; 477/188; 180/165; 180/65.2; 180/65.4
[58] Field of Search ............... 477/4, 184, 185, 477/188; 180/65.2, 65.3, 65.4, 165

[56] References Cited

U.S. PATENT DOCUMENTS 5,550,445 8/1996 Nii ............... 180/65.3 X

FOREIGN PATENT DOCUMENTS 41 24 496  1/1993  Germany.
6-70405    3/1994  Japan ............... 180/165

*Primary Examiner*—Charles A. Marmor
*Assistant Examiner*—Nathan O. Jensen
*Attorney, Agent, or Firm*—Evenson, McKeown, Edwards & Lenahan P.L.L.C.

[57] ABSTRACT

In a process and apparatus for braking a hybrid drive vehicle, kinetic vehicular energy is converted by the driving electric motor into electrical power, which alternatively can be absorbed by charging a traction battery or by driving a combustion engine via a generator coupled to the engine, which is functioning as a motor. According to the invention, engine braking is activated if the traction battery is fully charged, if its temperature lies outside a predetermined charging temperature range, or if the charging current due to the electrical power supplied by the driving electric motor exceeds a predetermined limit value.

6 Claims, 2 Drawing Sheets

PROCESS AND APPARATUS FOR BRAKING A HYBRID-DRIVE MOTOR VEHICLE

BACKGROUND AND SUMMARY OF THE INVENTION

The invention relates to a process and apparatus for braking a hybrid-drive motor vehicle of the type having a combustion engine, a generator mechanically coupled to the engine and a driving motor which can be electrically coupled to the generator and to a traction battery.

It is known that braking for hybrid-drive motor vehicles can be carried out not only by means of conventional friction-type service brakes, but also by means of a so-called regenerative braking, in which the driving electric motor functions as a generator and converts the kinetic energy of the vehicle into electric energy, which is then used to charge the traction battery of the hybrid drive. If braking by a wheel slip control system, for example an antilock brake system (ABS) or a drive slip control is triggered, then in a suitable manner, the regenerative braking operation is not activated.

German patent document DE 41 24 496 A1 describes a brake system which operates in this manner. In that system, one hydraulic brake circuit (with friction brakes) is provided for each of a driven axle and a nondriven axle. In addition, an electroregenerative brake system is provided for the drive wheels. Depending upon the braking demand sensed at the brake pedal, electroregenerative braking of the drive wheels is carried out in addition to the friction braking of the nondriven wheels. For this purpose, it is determined whether the momentary maximum usable electroregenerative braking power (which is determined from recorded momentary values for vehicle speed and the charge receiving capacity of the battery) is sufficient to supply the required braking force percentage for the drive axle. If not, the friction brakes of the drive wheels are also activated.

On the other hand, in motor vehicles with an electric drive motor which in normal operation is supplied with the required driving power by an electric generator driven by a combustion engine, German patent document DE 559147 discloses an arrangement in which braking action is generated by external excitation of the drive motor and, in generator function, by supplying the generator (which is mechanically coupled to the engine) with electrical energy. The generator then acts as a motor on the engine, which in turn, in engine braking, reduces the supplied energy by generating friction and heat.

Published, nonexamined Japanese patent disclosure JP 4-322105 (A) describes a process and a vehicle of this generic type. In the hybrid-drive motor vehicle shown there, the braking process is carried out in such a way that a regenerative braking operation is performed as long as the monitored voltage of the traction battery is below a predetermined limit value. If the battery voltage exceeds the limit value, the fuel supply for the internal combustion engine is interrupted, and a hybrid drive control unit triggers the inverter connected to the generator. With the electrical energy which is produced by the drive motor in generator operation, the inverter (functioning as a motor at this point) drives the engine as a load for absorbing the fed-back electrical energy. With the switchover to engine braking operation when the battery voltage has reached the predetermined limit value, the system is prevented from attempting to further charge the battery, since it is already fully charged and therefore cannot accept any further significant regenerative power.

However, there are also other operating states in which a battery should not be charged further: when the battery has become too hot and therefore should no longer be supplied with high charging current (because the temperature break point has been reached upon full charging to the nominal capacity), or because the battery has been under a heavy load at a high ambient temperature, or when because of the braking process, so much electrical power is supplied by the drive motor that the traction battery, which is designed for normal propulsion, cannot cope with the affiliated charging current without damage. It must be noted that in generator operation, the driving electric motor is capable of producing essentially higher power than in motor operation only at a predetermined maximum current, since the voltage (that is, the charging voltage), is higher in generator operation.

Published, examined East German patent application DT 19 05 641 B2 discloses a combined generator and mechanical brake apparatus for an electric-drive motor vehicle powered by a storage battery. Upon actuation of a brake lever, initially only regenerative braking is activated by feeding the electrical energy to the battery. Then, when maximum regenerative braking is reached, the mechanical brake is actuated upon further movement of the brake lever. A controller is provided, which if a critical charging state of the battery is reached, or more precisely as a function of the charge voltage and temperature of the battery, correspondingly reduces the application of the generator brake, and triggers a portion of the mechanical brake, which replaces this reduction of regenerative braking.

The object of the invention is to provide a process and apparatus of the kind mentioned at the beginning by means of which the braking procedures can be carried out by the hybrid drive system by reversing its normal power transmission direction, alone or in a supporting manner and without the danger of battery damage.

The object is attained by the process and apparatus according to the invention, in which the engine motor braking mode (electrical power generated by the drive system of the hybrid drive is absorbed by the engine braking action of the internal combustion engine) is activated not only when the traction battery is fully charged, but also when its temperature lies outside a predetermined charging temperature range, or when the magnitude of the charging current, which results from the electrical power supplied by the driving electric motor, exceeds a predetermined limit value. For this purpose, when a braking procedure is triggered, these battery parameters are recorded and evaluated in a conventional manner. This process prevents the sort of damage to the traction battery which can occur during regenerative braking, from battery overheating or from excessive charging current intensities, even under average brake demand, if the vehicle is traveling at relatively high speed.

This braking process can be used in a hybrid-drive motor vehicle which is provided with a battery monitoring unit for recording the required data on the battery state, and a hybrid drive control unit. Battery data from the monitoring unit can be supplied to the hybrid-drive control unit, which is designed so that depending upon an existing braking demand and She state of the traction battery (more precisely depending upon the charge state, temperature, and charging current magnitude), it controls the absorption of the electrical energy generated by the driving electric motor, by charging the traction battery or by driving the engine in the engine braking mode.

As a result of the process, the braking force required at the time can be exerted in an optimal way by feeding back energy into the hybrid drive. To the greatest extent possible, this energy is restored to the traction battery as electrical energy. Whenever such restoration is not favorable for the traction battery, however, engine braking is activated. When used in a motor vehicle, for example, this saves a corresponding braking force percentage of the friction-type service brakes in such cases. As a result, the brake pedal feel can be kept constant in relation to the braking action, wear and tear on the friction brake linings is diminished, and the brake linings furthermore are protected against safety-threatening overheating, even when driving on relatively long uphill or downhill grades.

In one embodiment of the invention, the hybrid drive control unit controls the throttle valve opening angle to adjust the braking effect of the engine, which is driven as an engine brake, in a manner appropriate to the situation. Aside from the level of the intrinsically desired engine power, and the type of operating mode that is switched on (such as an emission-free operating mode, intermittent charge operation, or continuous charging operation during highway driving), the relationship of throttle valve opening angle and the rpm of the engine in the engine braking mode depends upon the dynamic demands for brake power to be exerted, and upon other accompanying pedal feel upon redistribution of braking power levels onto the individual brake components, as well as upon other possible predetermined requirements (for example, that drag operation of the engine should not be allowed in the emission-free operating mode, or should be allowed only in a limited way, such as for an emergency brake). To carry out this modified process, a control line connection is provided between the hybrid drive control unit and a throttle valve actuating member.

In another embodiment of the invention, upon activation of an engine braking operation, the engine is first brought to a speed suitable for the existing situation, and actual engine braking operation is then initiated. Therefore, the desired engine braking action for the momentary situation is quickly made available. For this purpose, a speed suitable for the ensuing engine braking operation, when the throttle valve is open and the fuel supply is interrupted, may be determined, for example, by the hybrid drive control unit, depending upon the state of the traction battery, the vehicle speed and/or the brake pedal travel, so that the braking force percentage can be precisely adjusted by the engine braking, which is to be exerted alone or together with regenerative braking by charging the traction battery, and/or braking by friction brakes.

Other objects, advantages and novel features of the present invention will become apparent from the following detailed description of the invention when considered in conjunction with the accompanying drawings.

DETAILED DESCRIPTION OF THE PREFERRED EMBODIMENT

Figure 1:
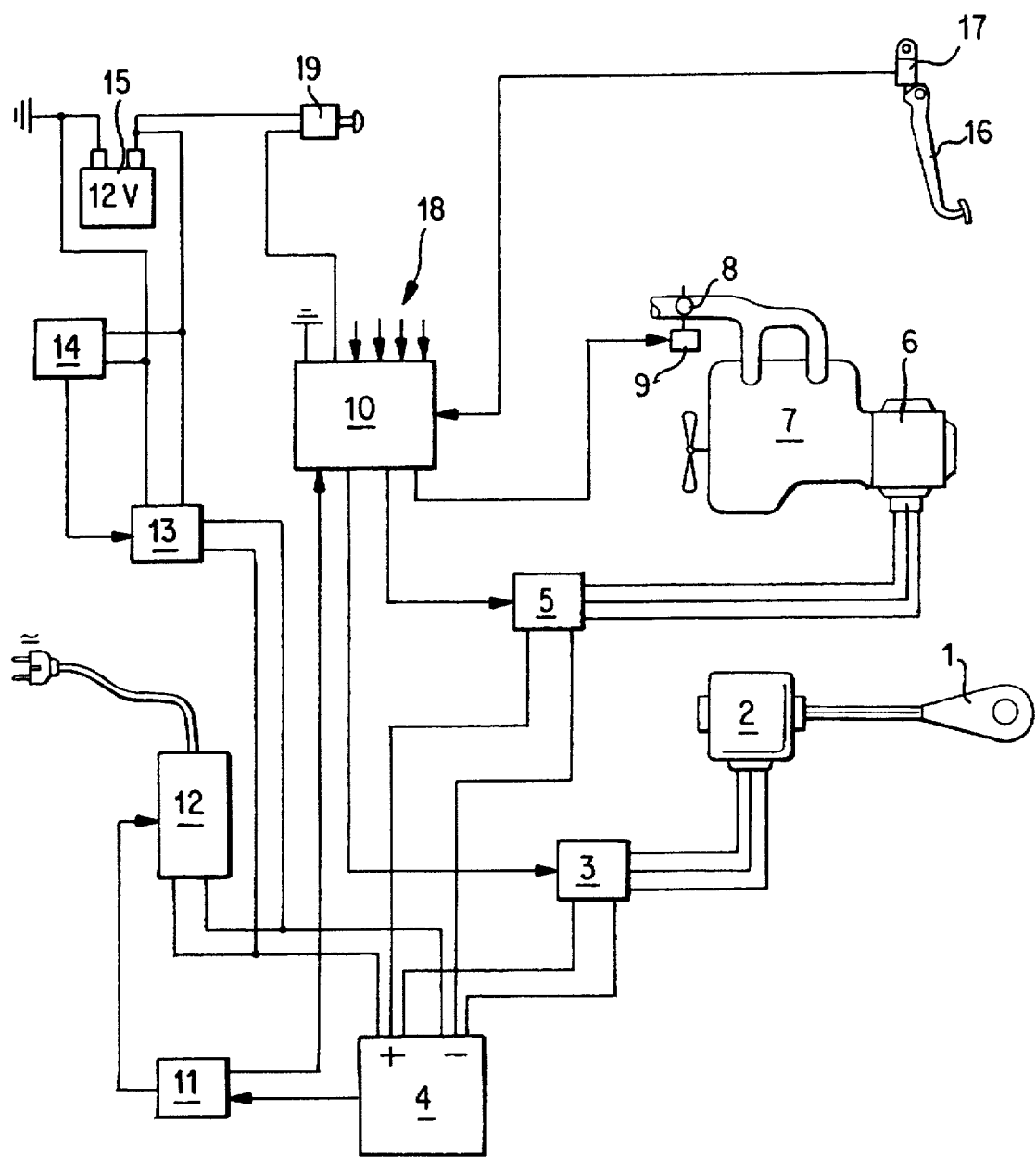
FIG. 1 shows a block diagram of a hybrid drive system for a motor vehicle which incorporates the braking arrangement accord o the invention.

In the hybrid drive system shown in the drawing, driving electric motor (2) is mechanically coupled to an axle drive (1) of the vehicle via a shaft. The alternating current connections of the electric motor (2) are connected via an AC line to the alternating current side of a first inverter (3). The DC side of the inverter (3) is connected on the one hand to a traction battery (4), which is also connected to the DC side of a second inverter (5). The AC side of the second inverter (5) is connected via a further AC line to the AC connections of a generator (6), which is mechanically coupled to an internal combustion engine (7) via a shaft (not shown). The engine (7) has a throttle valve (8) with an actuating member (9) that can be controlled via an electric gas pedal.

The above-described components constitute a conventional serial hybrid drive. A hybrid drive control unit (10), which controls the operation of the hybrid drive system, receives as inputs the required sensor signals (18), for instance from the electronic gas pedal, a wheel speed sensory mechanism, from an ABS control unit, etc. In order to carry out the braking process below, the hybrid drive control unit (10) also receives the signal of a potentiometer (17), which is associated with a brake pedal (16) and is used to record the pedal travel. In addition, it receives data on the battery state from a battery monitoring unit (11), which is connected to the traction battery (4) to monitor its charge state, temperature, and charging current magnitude. The hybrid drive control unit (10) evaluates the received input signals, and controls both inverters (3, 5) as well as the throttle valve adjusting member (9) in a suitable manner. For this purpose, control line lead from the control unit (10) to these units (3, 5, 9).

The traction battery (4) is connected to a line-charging device (12) to charge the battery (4) on the electric network if required. The line-charging device (12) is likewise supplied with data on the battery state from the battery monitoring unit (11). The traction battery (4) is furthermore connected to a DC/DC converter (13), which in turn is connected to a 12 V battery (15) of the vehicle. A battery monitoring unit (14) records the state of the 12 V battery (15) and suitably triggers the DC/DC converter (13) in order to charge it via the DC intermediate circuit, to which the traction battery is connected. A starting switch (19), whose signal output is supplied to the hybrid drive control unit (10), provides the appropriate information to start the vehicle.

The hybrid drive system shown in the Figure drives the vehicle alternatively by means of the energy produced by the engine (7) or by means of the energy stored in the traction battery (4), in a manner which is known and therefore not described here. Moreover, this hybrid drive system is also configured to carry out a braking function for the vehicle in addition to a customary brake system with friction brakes on the individual vehicle wheels. (The friction braking system per se also requires no further description here.) Brake regulation which can be carried out by the system is further described below.

A braking demand is signaled by actuation of the brake pedal (16), which the hybrid drive control unit (10) recognizes via the associated potentiometer (17). Depending upon the other input signals supplied, the control unit (10) then decides on the use of different braking modes. On the one hand, it can be provided, for example, that in certain driving situations engine braking is suppressed, so that braking is carried out with only the friction brake system. In other cases, if need be, regenerative braking is switched on so that the traction battery (4) is charged via the driving electric motor (2), which is working as a generator, and the suitably triggered first inverter (3). The general braking priority is to first activate regenerative braking. When the resulting battery charging is unfavorable due to the present battery state, or when the required braking power cannot be achieved by regenerative braking alone, then the system activates engine braking. If stronger braking force is demanded, the friction brake system is then activated as well. In addition, the hybrid drive control unit (10) switches off any braking function of the hybrid drive when it receives a signal via an activated wheel slip control by the ABS or a drive slip control, since the wheel slip control is carried out by actuation of the friction brakes.

Operating states in which regenerative charging of the traction battery (4) is unfavorable exist when the battery (4) is fully charged for more than merely a short duration low braking power is required (such as when driving on a relatively long grade); when the battery temperature exceeds a predetermined limit value and no further high charging currents should flow; or when in the case of a high driving speed, upon the braking demand, electrical power generated by the driving electric motor (2) is so great that the traction battery (4) (which is designed for normal driving performance) cannot receive this charging current without danger of damage. In such situations, the hybrid drive control unit (10) suitably triggers both inverters (3, 5) and the throttle valve adjusting member (9) so that the generator (6) brings the engine (7) to a suitable engine braking speed, and so that the desired engine braking power is guaranteed. The matching of the engine braking speed and the throttle valve opening angle to each other depends on the desired engine braking power as well as the momentary drive type (that is, emission-free operation, intermittent charge operation, or continuous charging operation as in highway driving), the dynamic demands on the resulting braking power with corresponding pedal feel upon redistribution of braking power to the various brake components, as well as on externally predetermined considerations such as the range in which the drag operation of the engine in the emission-free operating mode should be permitted.

When the system recognizes that given the existing braking demand it is favorable to activate the engine braking mode, the requisite control measures then depend on whether the engine (7) is at a standstill at the moment, or is in the driving mode. If the engine (7) is at a standstill such as in a pause phase of an intermittent charging operation (in which the engine (7) runs only at certain times in order to recharge the traction battery (4) as needed), control is carried out by the hybrid drive control unit (10) in such a way that when the throttle valve (8) is open and the fuel supply is interrupted, the generator (6), acting as a motor, brings the engine (7) to a speed determined by the control unit (10), in order thereafter to be able to receive the braking power. At this larger acceleration of the engine (7) , although higher current intensities flow in the generator (6), high power levels are not produced, because at low speeds, the current oscillates between the stator coils of the generator (6) and intermediary circuit capacitors of the inverter (5), without major consumption of external power. Next the system switches over to engine braking operation, in which the fuel supply remains shut off and the throttle valve (8) is brought into the suitable position, which is determined by the control unit (10).

On the other hand, if the engine (7) is running when a braking procedure is initiated, the engine (7) already has an initial speed. (This is the case, for example in the active phase of an intermittent charging operation or in continuous charging operation, as when there are firmly set operation points in best point operation, or as in operation on the best consumption curve at different power levels or outputs, in order to keep the change in the charging of the traction battery (4) slight and in order to produce the driving power of the vehicle approximately simultaneously.) By suitable system control by the hybrid drive control unit (10), when engine braking is commenced, the engine (7) is brought from its initial speed to the determined, favorable engine braking speed, from which it then switches over to the engine braking mode when there is uninterrupted fuel supply. To determine the suitable engine speed, the hybrid drive control unit (10) evaluates the battery operating state, the vehicle speed, and the brake pedal travel.

In general, for noise reasons, the best rotational speed is usually the lowest possible rotational speed; that is, the rotational speed which is sufficient to generate the required brake power when the throttle valve is closed. A deviation may take place from this mathematically optimal rotational speed if the braking operation is highly variable with respect to time in which case, when the brake power requirement decreases, the throttle valve may be opened first in order to render the rotational engine speed somewhat more uniform. When the brake power requirement increases, the excessive electric power is put into the rotational speed increase of the system. If, as a result, the motor-operated generator is overtaxed with respect to its maximal torque, the throttle valve may be opened for a faster increase of the rotational speed. If this brake power is also not yet sufficient, the friction service brake will take over the rest. This will also always apply when, for reasons of directional control, the power axle must only transmit a defined permissible braking torque.

Depending upon the operating state of the battery and the design of the brake system, the braking action of the engine (7) can already be switched on early each time, so that no differential load has to be exerted on the friction brake system if the braking function achieved by charging the traction battery (4) is no longer sufficient. Alternatively, it can be provided that a fixed brake power of the friction brake system be allowed for a certain duration, which the brake power of the engine braking is gradually increased, without annoying the driver by the onset of major braking action. In any case, it is possible to transition, where necessary, from purely electrical braking by the hybrid drive to braking with the friction brakes, gently, without substantial repercussions on the brake pedal travel and the brake pedal feel. In the event of a braking demand that is only very short in duration, the brake power which is to be supplied by the electrical brake components can be generated if need be by charging the traction battery (4), even if it is fully charged or has a high temperature, since the battery (4) is still capable of safely receiving a small quantity of charging current, even in this state.

Figure 2:
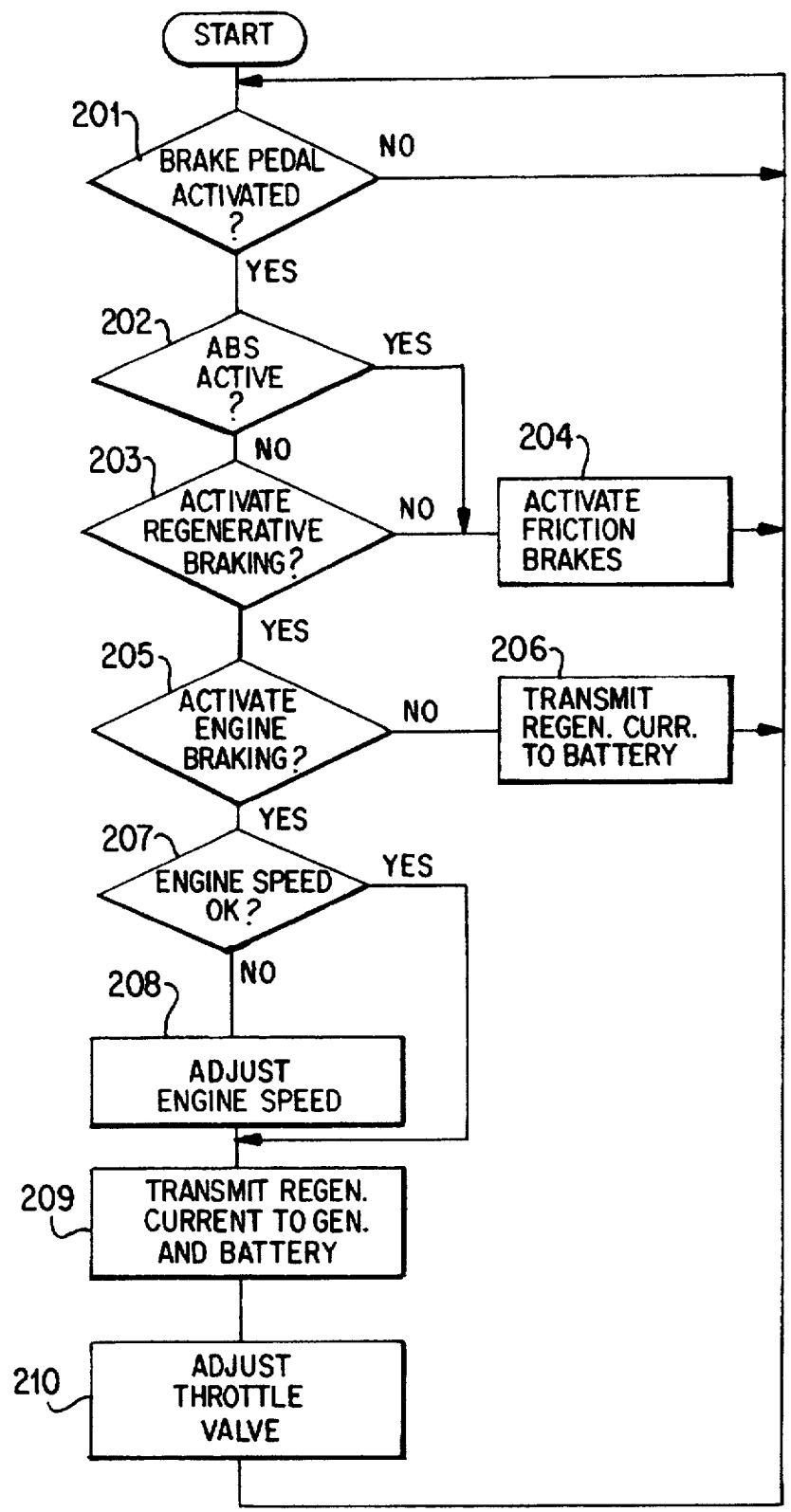
FIG. 2 is a flow diagram which illustrates the operation of the braking system according to the invention.

FIG. 2 is a flow diagram which illustrates the operation of the braking arrangement according to the invention, as described above. In step 201, it is determined whether the brake pedal has been actuated. I f not, then processing returns to the start and is repeated. If the brake pedal has been actuated, then a determination is made in step 202 whether ABS has been activated. If so, friction braking is activated in step 204, since as noted previously, regenerative braking would interfere with the ABS system, which operates through the friction brakes.

At step 203, it is determined whether regenerative braking is appropriate, depending on the driving mode as noted previously. If it is determined that regenerative braking cannot be activated, then once again, conventional friction braking is activated in step 204. Otherwise, in step 205, it is determined whether engine braking should also be initiated. As noted previously, this determination is made by the control unit 10 based on a comparison of battery charge, current and temperature with acceptable upper limits and based on whether regenerative braking alone can provide the desired braking action. As noted above, the first braking priority is regenerative braking. Accordingly, if regenerative braking can satisfy the braking requirement indicated by the brake pedal, then in step 206 the regeneration current from the motor 2 is transmitted to the traction battery 4, and processing is repeated. If however, it is determined in step 205 based on the parameters mentioned above, that regenerative braking alone is insufficient, then engine braking is activated and a further determination is made in step 207 whether the speed of the combustion engine is such that it will provide the desired braking force. If not, the engine speed is adjusted in step 208 in the manner described previously, and in step 209, a portion of the regenerated current from the motor 2 is transmitted to the generator 6 which functions as a motor and drives the combustion engine to provide engine braking. Finally, in step 210, the control unit 10 adjusts the engine throttle valve 8 so that the torque of the combustion engine corresponds to the drive torque of the generator, including the acceleration or deceleration torque of the assembly. Processing then returns to the start and is repeated.

The above-described system advantageously makes it possible to carry out braking procedures in a hybrid-drive motor vehicle, while conserving the friction brakes of the vehicle as well as the traction battery of the hybrid drive to the greatest extent possible, by additionally supplying engine braking action by the engine by reversing the power transmission path when driving the vehicle by means of the hybrid drive. Engine braking can be activated and the engine braking power can be suitably dispensed via the hybrid drive control unit.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A process for braking a hybrid drive motor vehicle having a combustion engine, a generator mechanically coupled with the engine, and a driving electric motor electrically coupled to the generator and to a traction battery, wherein during a braking procedure, the driving electric motor, in generator operation, converts kinetic energy into electric energy, which is alternatively absorbed by charging the traction battery or by driving the combustion engine, said process comprising the steps of:

monitoring the charge state, temperature and charging current of the traction battery; and activating engine braking upon the occurrence of at least one of the following:
the traction battery is fully charged;
the temperature of the traction battery lies outside a predetermined charging temperature range; and the charging current intensity for the traction battery, due to the electric power supplied by the driving electric motor, exceeds a predetermined limit value.

2. The process according to claim 1, comprising the further steps of adjusting engine braking action by controlling an opening angle of a throttle valve of the engine as a function of at least one of the following: required engine braking power, a momentary operation mode of the hybrid drive, and required brake power dynamics.

3. The process according to claim 1, comprising the further steps of:

bringing the engine to a selectable engine braking speed at the beginning of an engine braking demand; and controlling the engine in an engine braking operation.

4. The process according to claim 3, wherein the engine braking speed is chosen as a function of at least one of the following: state of the traction battery, vehicle speed, and pedal travel of a brake pedal of the vehicle.

5. An apparatus for braking a hybrid drive motor vehicle having a combustion engine, a generator mechanically coupled with the engine, and a driving electric motor electrically coupled to the generator and to a traction battery, wherein the driving electric motor carries out a drive function for the engine, and the engine is designed to carry out an engine braking function, said apparatus comprising:

a brake pedal sensor for detecting position of a brake pedal of said vehicle;

a traction battery monitoring unit which monitors an operating state of the traction battery; and a hybrid drive control unit coupled to receive output signals from said brake pedal sensor, a slip control system and said traction battery monitoring unit, said output signals from said traction battery monitoring unit including information concerning at least one charge state, temperature, and charging current of said traction battery;

said hybrid drive control unit including means for triggering at least one of battery charging braking and engine braking in response to a signal from said brake pedal signal, and for triggering engine braking upon the occurrence of at least one of the following:

the recorded battery charge state has exceeded a predetermined full charge limit value;

the battery temperature lies outside a predetermined charging temperature range; and the recorded charging current exceeds a predetermined charging current limit value.

6. The apparatus according to claim 5, further comprising a throttle valve adjusting member of said engine (7), which can be controlled by the hybrid drive control unit (10) in engine braking operation.

* * * * *